United States Patent [19]

Ishiwa et al.

[11] Patent Number: 5,403,878
[45] Date of Patent: Apr. 4, 1995

[54] POLYCARBONATE RESIN COMPOSITIONS FOR OPTICAL USE

[76] Inventors: Kenichi Ishiwa, Shimotsuga-gun; Hideyuki Itoi, Utsunomiya City, both of Japan

[21] Appl. No.: 32,230

[22] Filed: Mar. 17, 1993

[30] Foreign Application Priority Data

Mar. 17, 1992 [JP] Japan .................................. 4-090079

[51] Int. Cl.$^6$ ........................... C08K 5/55; C08K 5/36; C08K 3/38
[52] U.S. Cl. .................................... 524/158; 524/183; 524/393; 524/405; 524/461; 524/490
[58] Field of Search ............... 524/481, 490, 158, 183, 524/393, 405

[56] References Cited

U.S. PATENT DOCUMENTS

| | | | |
|---|---|---|---|
| 4,476,275 | 10/1984 | Giddings et al. | 528/487 |
| 4,626,566 | 12/1986 | Miller et al. | 524/490 |
| 4,686,245 | 8/1987 | Nelson | 524/183 |

FOREIGN PATENT DOCUMENTS

| | | |
|---|---|---|
| 0230015 | 7/1987 | European Pat. Off. . |
| 0520806 | 12/1992 | European Pat. Off. . |

*Primary Examiner*—Paul R. Michl
*Assistant Examiner*—LaVonda R. DeWitt

[57] ABSTRACT

Polycarbonate resin compositions suitable for optical uses and methods for their preparation are disclosed. The disclosed compositions are comprised of polycarbonate resins and α-olefin oligomers and exhibit good mold release and thermal stability while experiencing little discoloration or molecular weight reduction during molding.

15 Claims, No Drawings

POLYCARBONATE RESIN COMPOSITIONS FOR OPTICAL USE

The present invention relates to polycarbonate resin compositions for optical use, specifically to polycarbonate resin compositions for optical use which have good mold release and thermal stability, and show little discoloration during molding.

BACKGROUND OF THE INVENTION

Polycarbonate resins have excellent transparency and heat resistance, and low moisture absorption, and so are good as optical materials. In the manufacture of optical products such as compact disks or laser disks, there is a need for continuous production. The polycarbonate resins used for such products must therefore also have excellent mold release characteristics. And because they are molded at high temperatures, in excess of 300° C., the polycarbonate resins must have high thermal stability.

Polycarbonates are usually manufactured by the phosgene process. However, polycarbonates obtained in this way have the drawback of poor mold release, which complicates the continuous production of molded products from them. Polycarbonate compositions containing various added mold release agents are known, but those compositions have problems when it comes to thermal stability.

In addition, conventional polycarbonate resins tend to become discolored when they are molded. Optical materials should be both transparent and also free of optical distortion. In order to obtain moldings with less optical distortion, the molding temperature can be increased, or resins with lower average molecular weights can be used, to obtain better melt flow and thus minimize formation of optical inhomogeneities. However, increasing the resin temperature during molding tends to cause more discoloration due to polymer degradation. Using polycarbonates with lower average molecular weights can result in pronounced molecular weight lowering and discoloration during molding, as well as impaired mechanical properties.

Those problems are solved by the present invention, whose object is to provide polycarbonate resin compositions for optical uses with good mold release to facilitate production, good thermal stability, and very little discoloration during molding.

SUMMARY OF THE INVENTION

The present invention consists of polycarbonate resin compositions for optical uses, containing
A) 100 wt. parts polycarbonates having viscosity-average molecular weight 12,000~18,000, and
B) 0.001~5 wt. parts α-olefin oligomers,
in which the polycarbonates are products of melt polymerization of aromatic dihydroxy compounds with carbonate diesters.

These polycarbonate resin compositions have extremely good mold release. They also show very little discoloration during molding. In addition, they have good thermal stability, so there is little fouling of molds in continuous production, and little lowering of melt viscosity during molding. These effects of the present invention are a dramatic improvement over those observed using polycarbonates made by the conventional phosgene process, or compounded with common mold release agents. The combination of polycarbonate and mold release agent in accordance with the present invention provides the desired effect of the invention.

These polycarbonate resin compositions are particularly suitable for use in optical applications, especially for compact disks and laser disks.

The first essential condition of the present invention is the use of polycarbonates which are products of melt polymerization of aromatic dihydroxy compounds with carbonate diesters, and have viscosity-average molecular weights of 12,000~18,0000. As shown by the comparisons below, such an effect cannot be achieved when ordinary polycarbonates obtained by the phosgene process are used, even when α-olefin oligomers are added. On the other hand, using polycarbonates which are products of melt polymerization of aromatic dihydroxy compounds with carbonate diesters, in accordance with the present invention, the characteristics discussed above can be dramatically improved by the addition of α-olefin oligomers. This is something completely unforeseen.

The products of melt polymerization of aromatic dihydroxpy compounds with carbonate diesters referred to here include all polycarbonates obtained by a melt process using aromatic dihydroxy compounds and carbonate diesters as the starting materials. The melt process itself is a known method of synthesizing polycarbonates by a transesterification reaction between dihydroxy compounds and carbonate diesters in their molten state.

There is no particular restriction on the aromatic dihydroxy compounds; any of the various types of known compounds can be used. Examples include, but are not limited to, compounds represented by the formula

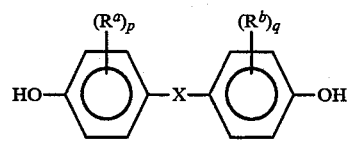

(where $R^a$ and $R^b$ are each independently a halogen or a monovalent hydrocarbyl group; X is —C($R^c$)($R^d$)—, —C(=$R^e$)—, —O—, —S—, —SO—, or —SO$_2$—; $R^c$ and $R^d$ are each independently a hydrogen atom or a monovalent hydrocarbyl group; $R^e$ is a divalent hydrocarbyl group; and p and q are each independently an integer. 0~4), such as bis(4-hydroxyphenyl)methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, bis(4-hydroxyphenyl)-phenylmethane, 2,2-bis(4-hydroxy-1-methylphenyl)propane, 1,1-bis(4-hydroxy-tert-butylphenyl)propane, 2,2-bis(4-hydroxy-3-bromophenyl)propane, and other bis(hydroxyaryl) alkanes; 1,1-bis(4-hydroxyphenyl)cyclopentane, 1,1-bis(4-hydroxyphenyl)cyclohexane, and other bis(hydroxyaryl) cycloalkanes; 4,4'-dihydroxydiphenyl ether, 4,4'-dihydroxy-3,3'-dimethylphenyl ether, and other dihydroxyaryl ethers; 4,4'-dihydroxydiphenyl sulfide, 4,4'-dihydroxy-3,3'-dimethylphenyl sulfide, and other dihydroxydiaryl sulfides; 4,4'-dihydroxydiphenyl sulfoxide, 4,4'-dihydroxy-3,3'-dimethyldiphenyl sulfoxide, and other dihydroxydiaryl sulfoxides; and 4,4'-dihydroxydiphenyl sulfone, 4,4'-dihydroxy-3,3'-dimethyldiphenyl sulfone, and other dihydroxydiaryl sulfones. Of these, 2,2-bis(4-hydroxyphenyl)propane is preferably used. Other aromatic dihydroxy compounds which can be used include those represented by the following general formula

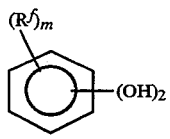

(where each $R^f$ is independently a hydrocarbyl group having 1–10 carbons, a halogenated hydrocarbyl group having 1–10 carbons, or a halogen atom; and m is an integer 0~4), such as resorcin, 3-methylresorcin, 3-ethylresorcin, 3-propylresorcin, 3-butylresorcin, 3-tert-butylresorcin, 3-phenylresorcin, 3-cumylresorcin, 2,3,4,6-tetrafluororesorcin, 2,3,4,6-tetrabromoresorcin, and other substituted resorcins; catechol; hydroquinone, 3-methylhydroquinone, 3-methylhydroquinone, 3-propylhydroquinone, 3-butylhydroquinone, 3-tert-butylhydroquinone, 3-phenylhydroquinone, 3-cumylhydroquinone, 2,3,5,6-tetramethylhydroquinone, 2,3,5,6-tetra-tertrabutylhydroquinone, 2,3,5,6-tetrafluorohydroquinone, 2,3,5,6-tetrabromohydroquinone, and other substituted hydroquinones; as well as 2,2,2′,2′-tetrahydro-3,3,3′-3′-tetramethyl-1,1′-spirobi-[1H-indene]-7,7′-diol represented by the following formula.

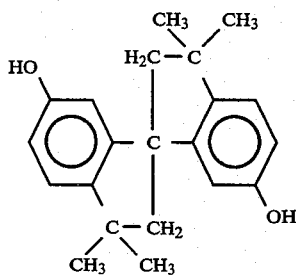

These aromatic dihydroxy compounds may be singly or in combinations of two or more, There is no particular restriction on the carbonate diesters, either. Examples include, but are limited to, diphenyl carbonate, ditolyl carbonate, (chlorophenyl) carbonate, m-cresyl carbonate, dinaphthyl carbonate, bis(diphenyl) carbonate, diethyl carbonate, dimethyl carbonate, dibutyl carbonate, dicyclohexyl carbonate, etc. Diphenyl carbonate is preferably used.

These carbonate esters may be used singly or in combinations of two or more.

These carbonate diesters may also contain dicarboxylic acids or dicarboxylate esters. Examples dicarboxylic acids and dicarboxylate esters include aromatic dicarboxylic acids and their derivatives, such as terephthalic acid, isophthalic acid, diphenyl terephthalate, diphenyl isophthalate, etc.; aliphatic dicarboxylic acids and their derivatives, such as succinic acid, glutaric acid, adipic acid, pimelic acid, suberic acid, azelaic acid, sebacic acid, decanedioic acid, dodecanedioic acid, diphenyl sebacate, diphenyl decanedioate, diphenyl dodecanedioate, etc.; and alicyclic dicarboxylic acids and their derivatives, such as cyclopropanedicarboxylic acid, 1,2-cyclobutanedicarboxylic acid, 1,3-cyclobutanedicarboxylic acid, 1,2-cyclopentanedicarboxylic acid, 1,3-cyclopentanedicarboxylic acid, 1,2-cyclohexanedicarboxylic acid, 1,3-cyclohexanedicarboxylic acid, 1,4-cyclohexanedicarboxylic acid, diphenyl cyclopropanedicarboxylate, diphenyl 1,2-cyclobutanedicarboxylate, diphenyl 1,3-cyclobutanedicarboxylate, diphenyl 1,2-cyclopentanedicarboxylate, diphenyl 1,3-cyclopentanedicarboxylate, diphenyl 1,2-cyclohexanedicarboxylate, diphenyl 1,3-cyclohexanedicarboxylate, diphenyl 1,4-cyclohexanedlcarboxylate, etc. These dicarboxylic acids and dicarboxylate esters may be used singly or in combinations of two or more. The carbonate diesters preferably contain no more than 50 mole %, more preferably no more than 30 mole %, of such dicarboxylic acids and dicarboxylate esters.

In the manufacture of the polycarbonates, in addition to the aromatic dihydroxy compounds and carbonate diesters, one can also use polyfunctional compounds having three or more functional groups per molecule. Such polyfunctional compounds are preferably compounds having phenolic hydroxy groups or carboxy groups; those having 3 phenolic hydroxy groups are particularly preferred. Examples of such preferred compounds include 1,1,1-tris(4-hydroxyphenyl)ethane, 2,2′,2″-tris(4-hydroxyphenyl)diisopropylbenzene [sic], α-methyl- α, α′, α′-tris(4-hydroxyphenyl)-1,4-diethylbenzene, α, α′, α″-tris(4-hydroxyphenyl)-1,3,5-triisopropylbenzene, phloroglucin, 4,6-dimethyl-2,4,6-tri(4-hydroxyphenyl)heptane-2, 1,3,5-tri(4-hydroxyphenyl)-benzene, 2,2-bis[4,4-(4,4′-dihydroxyphenyl)cyclohexyl]propane, trimellitic acid, 1,3,5-benzenetricarboxylic acid, pyromellitic acid, etc. Particularly preferred are 1,1,1-tris(4-hydroxyphenyl)ethane, α, α′, α″-tris(4-hydroxyphenyl)-1,3,5-triisopropylbenzene, etc. The polyfunctional compounds are preferably used in amounts of up to 0.03 mole, more preferably 0.001~0.02 mole, most preferably 0.001~0.01 mole, per mole of aromatic dihydroxy compounds.

Compounds which form one or more terminal groups represented by the formula

HO—, (1)

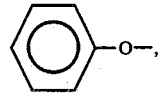 (2)

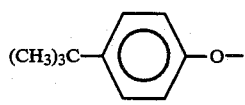 (3)

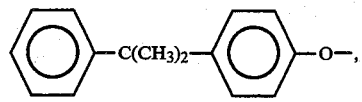 (4)

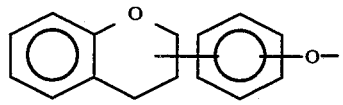 (5)

(where the aromatic ring or the chromanyl group may be substituted with halogens or alkyl groups having 1–9 carbons) can also be used in the manufacture of polycarbonates. Compounds capable of introducing hydroxyl groups (1) include diols such as bisphenol A. Compounds capable of introducing phenoxy groups (2) include phenol, diphenyl carbonate, etc. Compounds capable of introducing p-tert-butylphenoxy groups (3) include p-tert-butylphenol, p-tert-butylphenyl phenyl carbonate, p-tert-butyl phenyl carbonate, etc. Compounds capable of introducing p-cumylphenoxy groups (p-phenylisopropylphenoxy groups) (4) include p-cumylphenol, p-cumylphenyl phenyl carbonate, p-cumylphenyl carbonate, etc. Chromanylphenoxy groups (5) of the type indicated in the formula include those having the following formulas.

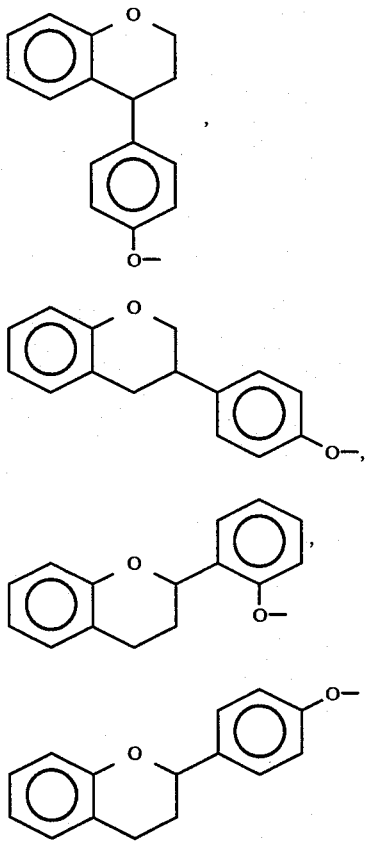

Compounds capable of introducing groups represented by (5-1) include 2,2,4-trimethyl-4-(4-hydroxyphenyl)-chroman, 2,2,4,6-tetramethyl-4-(3,5-dimethyl-4-hydroxyphenyl)chroman, 2,3,4-trimethyl-2-ethyl-4-(3-nonyl-4-hydroxyphenyl)-1-nonylchroman, 2,2,4-trimethyl-4-(3,5-diethyl-4-hydroxyphenyl )-6-ethylchroman, 2,2,4,6,8-pentamethyl-4-(3,5-dimethyl-4-hydroxyphenyl)chroman, 2,2,4-triethyl-3-methyl-4-(4-hydroxyphenyl)chroman, 2,2,4-trimethyl-4-(3-bromo-4-hydroxyphenyl)-6-bromochroman, 2,2,4-trimethyl-4-(3,5-dibromo-4-hydroxyphenyl)-6-bromochroman, 2,2,4-trimethyl-4-(3,5-dibromo-4-hydroxyphenyl)-6,8-dibromochroman, etc. Of these, 2,2,4-trimethyl-4-(4-hydroxyphenyl)chroman is particularly preferred. Compounds capable of introducing groups represented by (5-2) include 2,2,3-trimethyl-3-(4-hydroxyphenyl)-chroman, 2,2,3,6-tetramethyl-3-(3,5-dimethyl-4-hydroxyphenyl)chroman, 2,3,4-trimethyl-2-ethyl-3-(3-nonyl-4-hydroxyphenyl)-7-nonylchroman, 2,2,3-trimethyl-3-(3,5-diethyl-4-hydroxyphenyl)-6-ethylchroman, 2,2,3,6,8-pentamethyl-3-(3,5-dimethyl-4-hydroxyphenyl)chroman, 2,2,3-triethyl-3-methyl-3-(4-hydroxyphenyl)chroman, 2,2,3-trimethyl-3-(3-bromo-4-hydroxyphenyl)-6-bromochroman, 2,2,3-trimethyl-3-(3,5-dibromo-4-hydroxyphenyl)-6-bromochroman, 2,2,3-trimethyl-3-(3,5-dibromo-4-hydroxyphenyl)-6,8-dibromochroman, etc. Of these 2,2,3-trimethyl-3-(4-hydroxyphenyl)chroman is particularly preferred.

Compounds capable of introducing groups represented by (5-3) include 2,4,4-trimethyl-2-(2-hydroxyphenyl)-chroman, 2,4,4,6-tetramethyl-2-(3,5-dimethyl-2-hydroxyphenyl)chroman, 2,3,4-trimethyl-4-ethyl-2-(3,5-dimethyl-2-hydroxyphenyl )-7-nonylchroman, 2,4,4-trimethyl-2-(3,5-dimethyl-2-hydroxyphenyl )-6-ethylchroman, 2,4,4,6,8-pentamethyl-2-(3,5-dimethyl-2-hydroxyphenyl)-6-ethylchroman, 2,4,4-trimethyl-2-(3-bromo-2-hydroxyphenyl)chroman, 2,4,4-trimethyl-2-(3-bromo-2-hydroxyphenyl)-6-bromochroman, 2,4,4-trimethyl-2-(3,5-dibromo-2-hydroxyphenyl)-6-bromochroman, 2,4,4-trimethyl-2-(3,5-dibromo-2-hydroxyphenyl )-6,8-dibromochroman, etc. Of these, 2,2,4-trimethyl-2-(2-hydroxyphenyl)chroman [sic] is particularly preferred. Compounds capable of introducing groups represented by (5-4) include 2,4,4-trimethyl-2-(4-hydroxyphenyl)chroman, 2,4,4,6-tetramethyl-2-(3,5-dimethyl-4-hydroxyphenyl)chroman, 2,4,4-triethyl-2-(4-hydroxyphenyl)chroman, 2,3,4-trimethyl-4-ethyl-2-(3,5-dimethyl-4-hydroxyphenyl)-7-nonylchroman, 2,4,4-trimethyl-2-(3,5-diethyl-4-hydroxyphenyl)-6-ethylchroman, 2,4,4,6,8-pentamethyl-2-(3,5-dimethyl-4-hydroxyphenyl)-6-ethylchroman, 2,4,4-trimethyl-2-(3-bromo-4-hydroxyphenyl)chroman, 2,4,4-trimethyl-2-(3-bromo-4-hydroxyphenyl)-6-bromochroman, 2,4,4-trimethyl-2-(3,5-dibromo-4-hydroxyphenyl)-6-bromochroman, 2,4,4-trimethyl-2-(3,5-dibromo-4-hydroxyphenyl)-6,8-dibromochroman, etc. Of these, 2,4,4-trimethyl-2-(4-hydroxyphenyl)chroman is particularly preferred. All of these compounds may also have halogen or $C_{1-9}$ alkyl substituent groups on the aromatic or the aliphatic rings. These compounds may be used singly of in combinations of 2 or more. In the present invention, the residues of these dihydroxy compounds preferably make up no more than 50%, most preferably no more than 30%, of the total terminal groups.

The amount of carbonate diesters used should be 1.00~1.30 moles, most preferably 1.01~1.20 moles, per mole of aromatic dihydroxy compounds. The monomers should be made to react in the presence of a catalyst.

The catalyst used may be, for example, one of the compounds proposed by the present applicants in the specification of Japanese Patent Application No. 2-85218. Preferred examples include (a) organic acid salts, inorganic acid salts, oxides, hydroxides, hydrides, or alcoholates of metals such as alkali metals or alkaline-earth metals. Specific examples of such compounds include, but are not limited to, sodium hydroxide, potassium hydroxide, lithium hydroxide, sodium hydrogen carbonate, potassium hydrogen carbonate, lithium hydrogen carbonate, sodium carbonate, potassium carbonate, lithium carbonate, sodium acetate, potassium acetate, lithium acetate, sodium stearate, potassium stearate, lithium stearate, sodium boron hydroxide, lithium boron hydroxide, sodium phenyl borate, sodium benzoate, potassium benzoate, lithium benzoate, disodium hydrogen phosphate, dipotassium hydrogen phosphate, dilithium hydrogen phosphate, the disodium or dipotassium or dilithium salt of bisphenol A, the sodium or potassium or lithium salt of phenol, etc.; calcium hydroxide, barium hydroxide, magnesium hydroxide, strontium hydroxide, calcium hydrogen carbonate, barium hydrogen carbonate, magnesium hydrogen carbonate, strontium hydrogen carbonate, calcium carbonate, barium carbonate, magnesium carbonate, strontium carbonate, calcium acetate, barium acetate, magnesium acetate, strontium acetate, calcium stearate, barium stearate, magnesium stearate, strontium stearate, etc. These compounds may be used singly or in combinations of two or more. The amount of such alkali metal compounds and/or alkaline-earth metal compounds used is preferably $10^{-y} \sim 10^{-3}$ mole, more preferably $10^{-7} \sim 10^{-6}$ mole, most preferably $10^{-7} \sim 8 \times 10^{-7}$ mole, per mole of aromatic dihydroxy compounds.

In addition to these alkali metal compounds and/or alkaline-earth metal compounds, basic compounds (b) may also be used as catalysts. Examples of basic compounds include, but are not limited to, nitrogen compounds such as substituted ammonium hydroxides having alkyl, aryl, or alkaryl groups, e.g., tetramethylammonium hydroxide, tetraethylammonium hydroxide, tetrabutylammonium hydroxide, trimethylbenzylammonium hydroxide, etc.; tertiary amines such as trimethylamine, triethylamine, dimethylbenzylamine, triphenylamine, etc.; secondary or primary amines having methyl, ethyl, or other alkyl groups or phenyl, tolyl, or other aryl groups; ammonia; and basic salts such as tetramethylammonium borohydride, tetrabutylammonium borohydride, tetrabutylammonium tetraphenylborate, tetramethylammonium tetraphenylborate, etc. Of these, the ammonium hydroxides are particularly preferred. These basic compounds may be used singly or in combinations of two or more.

In the present invention, by using a combination of the above-mentioned (a) alkali metal compounds and/or alkaline-earth metal compounds, and
(b) nitrogen-containing basic compounds, it is possible to obtain high-molecular-weight polycarbonates with high polymerization activity.

It is also possible to use a combination of (a) alkali metal compounds and/or alkaline-earth metal compounds,
(b) nitrogen-containing basic compounds, and
(c) boric acid and/or borate esters.

When this type of combination is used as the catalyst, the (a) alkali metal compounds and/or alkaline-earth metal compounds are preferably used in the amounts specified above, and the (b) nitrogen-containing basic compounds are preferably used in amounts of $10^{-6} \sim 10^{-1}$ mole, most preferably $10^{-5} \sim 10^{-2}$ mole, per mole of aromatic dihydroxy compounds. The (c) boric acid or borate esters are preferably compounds represented by the following general formula $$B(OR^3)_{n'}(OH)_{3-n'}$$

(where $R^3$ is a hydrogen atom, an aliphatic hydrocarbyl group, an elicyclic hydrocarbyl group, or an aromatic hydrocarbyl group, and n' is an integer $1 \sim 3$). Examples include boric acid, trimethyl borate, triethyl borate, tributyl borate, trihexyl borate, triheptyl borate, triphenyl borate, tritolyl borate, trinaphthyl borate, etc. Of these, triphenyl borate is particularly preferred. The amount of (c) boric acid or borate ester used as a catalyst along with the above-mentioned compounds (a) and (b) is preferably $10^{-6} \sim 10^{-1}$ mole, most preferably $10^{-5} \sim 10^{-2}$ mole, per mole of aromatic dihydroxy compounds.

There is no restriction on conditions such as temperature and pressure during the melt polymerization reaction. The usual conditions for known processes can be used. The first-stage reaction is preferably carried out at $80^\circ \sim 250^\circ$ C., more preferably $100^\circ \sim 230^\circ$ C., most preferably $120^\circ \sim 190^\circ$ C., preferably for a period of $0 \sim 5$ hours, more preferably $0 \sim 4$ hours, most preferably $0.25 \sim 3$ hours, at ambient pressure. Then the reaction between the aromatic dihydroxy compounds and the carbonate diesters proceeds as the pressure in the reaction system is reduced and the temperature increased, and finally the reaction between aromatic dihydroxy compounds and carbonate diesters is completed in vacuo, preferably at $0.05 \sim 5$ mm Hg and $240^\circ \sim 320^\circ$ C.

The reaction between the types of aromatic dihydroxy compounds and carbonate diesters described above may be carried out continuously or batchwise. The apparatus used for this reaction may be a tank, a tubular reactor, or a reaction column.

The polycarbonates used are obtained by this kind of melt polymerization, and have a viscosity-average molecular weight $12,000 \sim 18,000$. If the viscosity-average molecular weight is below 12,000, there will be marked decrease in molecular weight during molding, resulting in lower heat resistance and mechanical properties such as ductility and impact strength, and a tendency to crystallize easily causing molding problems. If the viscosity-average molecular weight exceeds 18,000, the melt flow of the material will be lowered, making it necessary to mold at temperatures in excess of 400° C. to get products with low optical distortion. At such temperatures it would be impossible to avoid decomposition of the resin, which could cause discoloration or silver streaks or otherwise impair the transparency of the molded products. The viscosity-average molecular weight can be calculated from the intrinsic viscosity of the polycarbonate resin using the equation $$\eta = KM^a$$

(where $\eta$ is the intrinsic viscosity (dL/g), the constant K is $1.23 \times 10^{-4}$, M is the viscosity-average molecular weight, and the exponent a is 0.83).

The second essential condition in the present invention is that the resin composition contain $0.001 \sim 5$ wt. parts $\alpha$-olefin oligomers per 100 wt. parts polycarbonates.

There is no particular restriction on the $\alpha$-olefin oligomers; all oligomers made up of $\alpha$-olefin units are included. Nor is their any restriction on the $\alpha$-olefin itself. Examples, such as those listed in Japanese Early Patent Disclosure Publication No. 62-190250, include n-$\alpha$-olefins having 6 to 12 carbons, of which 1-undecene is a representative example. The $\alpha$-olefin oligomere are preferably chains of $2 \sim 7$ repeating units, or mixtures thereof. It is also desirable that the oligomers be hydrogenated to eliminate any unsaturated bonds. Particularly preferred are 1-undecene dimers, trimere, tetramere, pentamers, or mixtures thereof. Examples include 9-methyl-11-n-octylhenelcosane, and Emery 3002 ®, Emery 3004 ®, and Emery 3006 ® manufactured by Emery Industries.

Resin compositions in accordance with the present invention also preferably contain acidic sulfur-containing compounds having a $pK_a$ of 3 or below, or derivatives of such compounds, in amounts of $0.00001 \sim 0.00045$ wt. parts per 100 wt. parts of polycarbonates. These compounds make the polycarbonate resin compositions more heat resistant, in particular by inhibiting molecular weight reduction during molding. Any such compound having a $pK_a$ of 3 or below, or any derivative thereof, may be used. Preferred compounds include those represented by the following formula

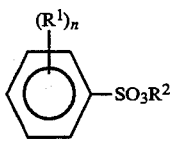

(where $R^1$ is an alkyl group having 1~50 carbons, in which halogen atoms may be substituted for hydrogen atoms; $R^2$ is a hydrogen atom or an alkyl group having 1~50 carbons, in which halogen atoms may be substituted for hydrogen atoms; and n is an integer 0~3). Specific examples of such compounds include, but are not limited to, sulfonic acids such as benzenesulfonic acid and p-toluenesulfonic acid; sulfonic acid esters such methyl benzenesulfonate, ethyl benzenesulfonate, butyl benzenesulfonate, octyl benzenesulfonate, phenyl benzenesulfonate, methyl p-toluenesulfonate, ethyl p-toluenesulfonate, butyl p-toluenesulfonate, octyl p-toluenesulfonate, and phenyl p-toluenesulfonate; and compounds such as trifluoromethanesulfonic acid, naphthalenesulfonic acid, sulfonated polystyrene, methyl acrylate-sulfonated styrene copolymer, etc. It is also possible to use two or more of these compounds together, Butyl p-toluenesulfonate is particularly preferred.

Polycarbonate resin compositions in accordance with the present invention may also contain added boron compounds. The boron compounds may be boric acid or borate esters such as those listed previously as catalyst components, although they are not limited to those compounds. Compounds represented by the above-mentioned general formula $B(OR^3)_{n'}(OH)_{3-n'}$ are preferably used. A particularly preferred boron compound is triphenyl borate. Adding such boron compounds can prevent discoloration of the polycarbonate resin composition during molding, especially if they are added in combination with the type sulfur-containing compounds described above. The amount of boron compounds added is preferably 0.00001~0.2 wt. part, most preferably 0.00005~0.02 wt. part, per 100 wt. parts of polycarbonate. If boron compounds are added as catalyst components during polymerization of the polycarbonate, there is no need to add more after polymerization.

If the amount of such boron compounds or acidic sulfur compounds or derivatives used is excessive, however, the water resistance of the polycarbonate resin composition may be lowered.

Polycarbonate resin compositions in accordance with the present invention may also contain phosphorus compounds or carboxyl at e eat era added as processing stabilizers (antioxidants). Among the phosphorus compounds which may be used are phosphate esters and phosphite esters. Examples of phosphate esters include trialkyl phosphates such as trimethyl phosphate, triethyl phosphate, tributyl phosphate, trioctyl phosphate, tridecyl phosphate, trioctadecyl phosphate, distearyl pentaerythrityl diphosphate, tris(2-chloroethyl) phosphate, and tris(2,3-dichloropropyl)phosphate; tricycloalkyl phosphates such as tricyclohexyl phosphate; and triaryl phosphates such as triphenyl phosphate, tricresyl phosphate, tris(nonylphenyl) phosphate, and 2-ethylphenyl diphenyl phosphate. Examples of phosphite set esters include trialkyl phosphites such trimethyl phosphite, triethyl phosphite, tributyl phosphite, trioctyl phosphite, tris(2-ethylhexyl) phosphite, trinonyl phosphite, tridecyl phosphite, trioctadecyl phosphite, tristearyl phosphite, tris(2-chloroethyl) phosphite, and tris(2,3-dichloropropyl) phosphite; tricycloalkyl phosphites such as tricyclohexyl phosphite; triaryl phosphite, such as triphenyl phosphite, tricresyl phosphite, tris(ethylphenyl) phosphite, tris(2,4-di-tert-butylphenyl) phosphite, tris(nonylphenyl) phosphite, and tris(hydroxyphenyl) phosphite; aryl alkyl phosphites such as phenyl didecyl phosphite, diphenyl decyl phosphate, diphenyl isooctyl phosphite, phenyl isooctyl phosphite, and 2-ethylhexyl of phosphite esters include trialkyl phosphites such as trimethyl phosphite, triethyl phosphite, tributyl phosphite, trioctyl phosphite, tris(2-ethylhexyl) phosphite, trinonyl phosphite, tridecyl phosphite, trioctadecyl phosphite, tristearyl phosphite, tris(2-chloroethyl) phosphite, and tris(2,3-dichloropropyl) phosphite; tricycloalkyl phosphites such as tricyclohexyl phosphite; triaryl phosphites such as triphenyl phosphite, tricresyl phosphite, tris(ethylphenyl) phosphite, tris(2,4-di-tert-butylphenyl) phosphite, tris(nonylphenyl) phosphite, and tris(hydroxyphenyl) phosphite; aryl alkyl phosphites such as phenyl didecyl phosphite, diphenyl decyl phosphite, diphenyl isooctyl phosphite, phenyl isooctyl phosphite, and 2-ethylhexyl diphenyl phosphite; as well as distearyl pentaerythrityl diphosphite, bis(2,4-di-tert-butylphenyl)pentaerythrityl diphosphite, and phosphite esters represented by the general formula $$P(OR^g)_3$$

(where each $R^g$ is independently an aliphatic hydrocarbyl group, alicyclic hydrocarbyl group, or aromatic hydrocarbyl group). One can also use hypophosphorous acid, pyrophosphoric acid, polyphosphoric acid, etc. Of these various compounds, phosphite esters are preferred, especially tris(2,4-di-tert-butylphenyl) phosphite. Examples of carboxylate esters, in addition to the compounds previously listed, include but are not limited to n-octadecyl 3-(4'-hydroxy-3',5'-di-tert-butylphenyl)propionate, various alicyclic diepoxy carboylates, etc. Two or more stabilizers may be used together. These compounds are preferably used in amounts not exceeding 0.1 wt. part per 100 wt. parts of polycarbonate.

Polycarbonate resin compositions in accordance with the present invention also preferably contain epoxy compounds, so t hat excess boron compounds or acidic sulfur compounds present in the resin composition will react with the epoxy compounds and be neutralized, making it possible to form moldings having excellent color tone, heat resistance, water resistance, etc. The epoxy compounds used may be any compounds having one or more epoxy groups per molecule. Examples include, but are not limited to, epoxidized soybean oil, epoxidized linseed oil, phenyl glycidyl ether, allyl glycidyl ether, tert-butylphenyl glycidyl ether, 3,4-epoxycyclohexylmethyl 3,4-epoxycyclohexanecarboxylate, 3,4-epoxy-6-methylcyclohexylmethyl 3,4-epoxy-6-methylcyclohexanecarboxylate, 2,3-epoxycyclohexylmethyl 3,4-epoxycyclohexanecarboxylate, 4-(3,4-epoxy-5-methylcyclohexyl)butyl 3,4-epoxycyclohexanecarboxylate, 3,4-epoxycyclohexylethylene oxide, cyclohexylmethyl 3,4 -epoxycyclohexanecarboxylate, 3,4-epoxy-6-methylcyclohexylmethyl 6-methylcyclohexanecarboxylate, bisphenol A diglycidyl ether, tetrabromobisphenol A glycidyl ether, the diglycidyl ester of phthalic acid, the diglycidyl ester of hexahydrophthalic acid, bis(epoxydicyclopentadienyl) ether, bisepoxyethylene glycol [sic], bis(epoxycyclohexyl) adipate, butadiene diepoxide, tetraphenylethylene epoxide, octyl epoxy talate [sic], epoxidized polybutadiene, 3,4-dimethyl-1,2-epoxycyclohexane, 3,5-dimethyl-1,2-epoxycyctohexane, 3-methyl-5-tert-butyl-1,2-epoxycyclohexane, octadecyl 2,2-dimethyl-3,4-epoxycyclohexanecarboxylate, n-butyl 2,2-dimethyl-3,4-epoxycyclohexanecarboxylate, cyclohexyl 2-methyl-3,4-epoxycyclohexanecarboxylate, n-butyl 2-isopropyl-3,4-epoxy-5-methylcyclohexanecarboxylate, octadecyl 3,4-epoxycyclohexanecarboxylate, 2-ethylhexyl 3',4'-epoxycyclohexanecarboxylate, 4,6-dimethyl 2,3-epoxycyclohexyl 3',4'-epoxycyclohexanecarboxylate, 4,5-epoxytetrahydrophthalic anhydride, 3-tert-butyl-4,5-epoxytetrahydrophthalic anhydride, diethyl 4,5-epoxy-cis-1,2-cyclohexanedicarboxytate, di-n-butyl 3-tert-butyl-4,5-epoxy-cis-1,2-cyclohexanedicarboxylate, etc. These epoxy compounds may be used singly, or in combinations of two or more. There is no particular limitation on the amount of epoxy compounds used, but it is usually preferable to add 0.001~0.1 wt. part, most preferably 0.001~0.08 wt. part, per 100 wt. parts of polycarbonates.

Polycarbonate resin compositions in accordance with the present invention may also contain one or more common additives such as heat stabilizers, weather stabilizers, antistatic agents, slip agents, antiblocking agents, antifogging agents, lubricants, dyes, natural oils, synthetic oils, waxes, etc., in amounts which do not interfere with the object of the present invention.

There is no particular restriction on the method used to combine these components to form resin compositions in accordance with the present invention. The components may be mixed in any order. For example, the α-olefin oligomers and any optional components may be added to the molten polycarbonate and kneaded, or the α-olefin oligomers and any optional components may be added to a solution of the polycarbonate and later kneaded. More specifically, the molten polycarbonate reaction product obtained on completion of polymerization may be mixed in the reaction vessel or extruder with the α-olefin oligomers and any optional components, either one after another or all at once. Or the polycarbonate may be pelletizod First, and the pellets then fed to a single-screw or twin-screw extruder along with the α-olefin oligomers and any optional components, and melt kneaded. It is also possible to dissolve the polycarbonate in a suitable solvent (e.g., methylene chloride, chloroform, toluene, tetrahydrofuran, etc.), then add the α-olefin oligomers and any optional components to the solution, either one after another or all at once, while stirring.

Polycarbonate resin compositions in accordance with the present invention are preferably subjected to a vacuum treatment. There is no particular restriction on the process or equipment used for vacuum treatment. For example, one could use a reactor having a vacuum device, or a vacuum-vented extruder. The reactor having a vacuum device may be either a vertical tank reactor or a horizontal tank reactor, although horizontal tank reactors are preferred. The vacuum-vented extruder may be either a single-screw or twin-screw extruder, which performs the vacuum treatment while pelletizing the polymer. If the vacuum treatment is performed in an evacuated reactor vessel, the pressure is preferably lowered to 0.05~750 mm Hg, most preferably 0.05~5 mm Hg. If the vacuum treatment is performed in an extruder, the pressure is preferably lowered to 1~750 mm Hg, most preferably 5~700 mm Hg. Such a vacuum treatment is preferably performed at 240°~350° C., for a period of 5 minutes to 3 hours in a reactor, or 10 seconds to 15 minutes in an extruder. Performing this kind of vacuum treatment makes it possible to obtain polycarbonate compositions containing less residual monomers or oligomers. For example, in the case of melt polymerization using diphenyl carbonate as the carbonate diestar, vacuum treatment can decrease the amount of residual diphenyl carbonate in the polycarbonate. The polycarbonate should preferably contain no more than 0.1 wt. part, most preferably no more than 0.01 wt. part, of residual diphenyl carbonate.

Resin compositions thus obtained, in accordance with the present invention, show good mold release and thermal stability, with very little discoloration or mold fouling when they are molded.

The present invention will now be described in greater detail by means of some examples, although it is by no means limited to these examples.

DETAILED DESCRIPTION OF THE PREFERRED EMBODIMENTS

[REFERENCE EXAMPLE 1]

Synthesis of Polycarbonate (PC1) by Melt Process

A 250-liter stirred tank reactor was filled with 0.44 kilomole of bisphenol A (from Nihon GE Plastics) and 0.44 kilomole of diphenyl carbonate (from Eni Co.), then purged with nitrogen, and the contents were melted at 140° C.

The temperature was raised to 180° C., 0.011 mole of triphenyl borate was added, and the mixture was stirred for 30 minutes.

Then 0.00044 mole of sodium hydroxide and 0.11 mole of tetramethylammonium hydroxide were added as catalysts, and stirring was continued for 30 minutes, after which the temperature was raised to 210° C. as the pressure was gradually lowered to 200 mm Hg. After 30 minutes, the temperature was increased to 240° C. and the pressure gradually lowered to 15 mm Hg. The temperature and pressure were then kept constant, and the amount of phenol distilled off was measured. When phenol stopped distilling off, the reactor was pressurized to atmospheric pressure with nitrogen. The time required for the reaction was 1 hour.

The intrinsic viscosity ($\eta$) of the reaction product was 0.15 dL/g.

The reaction product was then fed by a gear pump to a centrifugal thin-film evaporator for further reaction. The evaporator temperature and pressure were controlled at 270° C. and 2 mm Hg. A gear pump was used to feed the product from the bottom of the evaporator at a rate of 40 kg/hr to a horizontal twin-impeller stirred tank (L/D=3, impeller blade diameter 220 mm, capacity 80 liters), where polymerization was continued at 280° C. and 0.2 mm Hg, with a residence time of 30 minutes.

The molten polymer was then fed by a gear pump to a twin-screw extruder (L/D=17.5, barrel temperature 285° C.), to which 2 ppm of butyl p-toluenesulfonate was added and kneaded into the polymer. The resulting polymer was extruded through a die to form a strand, and cut into pellets.

The viscosity-average molecular weight of the polymer thus obtained was 15,500.

[Examples 1~2, Comparisons 1~3]

The following components were combined in the proportions shown in Table 1, mixed in a single-screw extruder (L/D=17.5, temperature 280° C.), and pelletized.

PC1: polycarbonate obtained in Reference Example 1

PC2: polycarbonate made from bisphenol A by phosgene process (viscosity-average molecular weight 15,500)

Emery 3004 ®: α-olefin oligomer (average of 31 carbons per molecule) comprising 89% 1-undecene trimer and 11% 1-undecene tetramer, from Emery Industries Stabilizers:
  Stb1: tris(2,4-di-tert-butylphenyl) phosphite [MK 2112E ®, from Adeka Argus]
  Stb2: alicyclic diepoxy carboxylate [Celloxide 2021P ®, from Daicel]

The resulting pellets were fed to a single-screw extruder (L/D=28, temperature 280° C.), then to a 150-t injection-molding machine (cylinder temperature 280° C., mold temperature 80° C.) to form moldings (150 mm high, 80 mm wide, 70 mm thick).

The moldings thus obtained were evaluated as follows.

Initial YI (Yellowness Index): The X, Y, and Z values of 3-mm plates (molded at cylinder temperature 290° C., injection pressure 1000 kg/cm$^2$, cycle time 45 seconds, mold temperature 90° C.) were measured by the transmission method using an ND-1001 DP Color and Color Difference Meter (from Nippon Denshoku Kogyo), and the yellowness index was calculated using the formula YI=100×(1.277X−1.060Z)/Y YI After 15 Minutes at 320° C. ("320–15 YI" in Table 1): Injection moldings were prepared as above, except that the cylinder temperature was 320° C. and the composition was held in the cylinder for 15 minutes before injection, then the YI of the moldings was determined as above.

Initial MI (melt index): The melt index of the pelletized composition was measured by the JIS K-7210 standard method, at 300° C. with a load of 1.2

MI After 15 Minutes at 320° C. ("320–15 MI" in Table 1): Measured as for the initial MI, using plates molded after holding up the resin for 15 minutes at 320° C. as described above The results are shown in Table 1.

The pellets prepared as above were used to mold compact disks (CDs) 120 mm in diameter using a nickel stamper, with a cylinder temperature of 350° C., a cycle time of 7 seconds, and a mold temperature of 80° C., in a continuous operation for 24 hours.

The CDs thus obtained were tested for the following characteristics.

Continuous Production Quality: Noted whether problems occurred during the continuous production run Stamper Fouling at 24 hours: After producing CDs continuously as described above for 24 hours, the stamper was examined visually for fouling.

These results are also shown in Table 1.

TABLE 1

| Experiment[1] | Ex. 1 | Ex. 2 | Co. 1 | Co. 2 | Co. 3 |
|---|---|---|---|---|---|
| Composition | | | | | |
| PC1 | 100 | 100 | 100 | — | — |
| PC2 | — | — | — | 100 | 100 |
| Emery 3004 | 0.1 | 0.3 | — | 0.1 | 0.3 |
| Stb1 | 0.01 | 0.01 | 0.01 | 0.01 | 0.01 |
| Stb2 | 0.01 | 0.01 | 0.01 | 0.01 | 0.01 |
| Characteristic | | | | | |
| Initial YI | 1.4 | 1.4 | 1.3 | 1.4 | 1.4 |
| 320-15 YI | 1.6 | 1.6 | 1.5 | 2.0 | 2.2 |
| Initial MI | 10.5 | 10.8 | 10.5 | 10.8 | 10.8 |
| 320-15 MI | 11.8 | 12.0 | 11.8 | 14.2 | 16.5 |
| Suitability for Continuous Production | OK | OK | NG[2] | OK | OK |
| Stamper Fouling After 24 Hours | none | none | — | some | much |

[1] Ex.→ Example, Co.→ Comparison
[2] Continuous production impossible due to problems caused by poor mold release (disk sticking in mold, etc.)

As can be seen from the examples, resin compositions in accordance with the present invention show better mold release and thermal stability, and consequently less mold fouling and better continuous production characteristics, than compositions having as their main component polycarbonate resins obtained by the phosgene process. Resin compositions in accordance with the present invention also have the advantage of showing very little discoloration or molecular weight decrease during molding.

What is claimed is:

1. A polycarbonate resin composition comprising
   (A) 100 parts by weight of a polycarbonate having a viscosity-average molecular weight of about 12,000–18,000
   (B) 0.001–5 parts by weight of an α-olefin oligomer and
   (C) 0.00001–0.00045 parts by weight of an acidic sulfur-containing compound having a pKa of no more than 3 or a derivative formed from said sulfur-containing compound wherein the polycarbonate is a product of melt polymerization of an aromatic dihydroxy compound and a carbonate diester.

2. The polycarbonate resin composition of claim 1, in which the α-olefin oligomer contains a compound selected from the group consisting of 1-undecene dimer, trimer, tetramer, and pentamer.

3. The polycarbonate resin composition of claim 1 wherein the sulfur-containing compound is represented by the formula

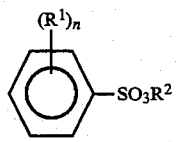

where R$^1$ is an alkyl group having 1–50 carbons or an alkyl group having 1–50 carbons and halogen atoms substituted for hydrogen atoms; R$^2$ is a hydrogen atom, an alkyl group having 1–50 carbons or an alkyl group having 1–50 carbons and halogen atoms substituted for hydrogen atoms; and n is an integer 0–3.

4. The composition of claim 1 further comprising 0.00001 to 0.2 parts by weight per hundred parts by weight of polycarbonate of a boron compound.

5. The composition of claim 4 wherein the boron compound is represented by the general formula $$B(OR^3)_{n'}(OH)_{3-n'}$$

where $R^3$ is a hydrogen atom, an aliphatic hydrocarbyl group, an alicyclic hydrocarbyl group, or an aromatic hydrocarbyl group, and $n'$ is an integer 1-3.

6. The composition of claim 5 wherein the boron compound is selected from the group consisting of boric acid, trimethyl borate, triethyl borate, tributyl borate, trihexyl borate, triheptyl borate, triphenyl borate, tritolyl borate and trinaphthyl borate.

7. The composition of claim 6 wherein the boron compound is triphenyl borate.

8. The composition of claim 3 wherein the sulfur-containing compound is butyl para-toluenesulfonate.

9. The polycarbonate resin composition of claim 1 wherein the polycarbonate is a product of melt polymerization of an aromatic dihydroxy compound with a carbonate diester in the presence of from $10^{-8}$ to $10^{-3}$ mole of an alkali metal or alkaline-earth metal compound per mole of aromatic dihydroxy compound.

10. A melt-polymerized polycarbonate resin composition comprising
   (A) a polycarbonate having a viscosity-average molecular weight ranging from about 12,000 to about 18,000,
   (B) an α-olefin oligomer and
   (C) 0.00001 to 0.2 parts by weight per hundred parts by weight of polycarbonate of a boron compound.

11. A polycarbonate resin composition according to claim 10 wherein said polycarbonate comprises 100 parts by weight per 0.001-5 parts by weight of said α-olefin oligomer.

12. The polycarbonate resin composition of claim 10 wherein the boron compound is represented by the general formula $$B(OR^3)_{n'}(OH)_{3-n'}$$

where $R^3$ is a hydrogen atom, an aliphatic hydrocarbyl group, an alicyclic hydrocarbyl group, or an aromatic hydrocarbyl group, and $n'$ is an integer 1-3.

13. The composition of claim 12 wherein the boron compound is selected from the group consisting of boric acid, trimethyl borate, triethyl borate, tributyl borate, trihexyl borate, triheptyl borate, triphenyl borate, tritolyl borate and trinaphthyl borate.

14. The composition of claim 13 wherein the boron compound is triphenyl borate.

15. A process for preparing a polycarbonate resin composition for optical uses comprising
   (A) a polycarbonate resin
   (B) an α-olefin oligomer and
   (C) 0.1 to 10 parts per million of an acidic sulfur-containing compound having a pK of no more than 3 which process comprises melt-polymerizing said polycarbonate resin from an aromatic dihydroxy compound and a carbonate diester in the presence of an alkali metal or an alkaline-earth metal catalyst and mixing therewith said oligomer and said acidic sulfur-containing compound.

* * * * *